United States Patent Office 2,710,259
Patented June 7, 1955

2,710,259

PRESERVATION OF CITRUS FRUIT

Edward S. Blake, Lexington, Mass., and Norman R. Piesbergen, Collinsville, Ill., assignors to Monsanto Chemical Company, St. Louis, Mo., a corporation of Delaware No Drawing. Application April 16, 1951,
Serial No. 221,330

12 Claims. (Cl. 99—154)

This invention relates to methods of treating fruit to prevent or inhibit the growth of destructive fungi. More particularly the invention relates to treatment of citrus fruit for the purpose of preventing the development of fungus which causes "stem-end rot."

Citrus fruit is subject to attack by the fungi, *Phomopsis citri* and *Diplodia natalensis*, which produce the effect known to the citrus fruit industry as "stem-end rot." Other objectionable fungi are also common, for example and blue and green penicillia molds. These organisms cause extensive destruction to citrus fruit during storage and shipping.

The primary purpose of this invention is to provide improved methods of treating fruit to prevent loss by action of fungus. A further purpose of the invention is to provide a fungicidal method which does not injure the fruit chemically. Further purposes of the invention will be apparent from the following disclosure.

It has been found that thionocarbamate esters are effective in inhibiting the growth of stem-end rot and blue mold producing organisms. The treatment is effected by contacting the fruit with a solution or dispersion of the thionocarbamate by dipping, spraying or otherwise coating the surface. In general concentrations of 0.5 to 10% by weight on the thionocarbamate are useful but preferred practice involves use of concentrations of about 1 to 5% by weight.

The thionocarbamates useful in the practice of this invention may be represented by the structural formula:

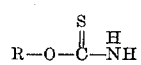

where R represents an alkyl, alkylene, alicyclic or aralkyl group. The lower members of the series such as methyl, ethyl, isopropyl and n-propyl are preferred since some injury has been observed with higher members. However, low concentrations of higher members can be used. Further examples of R are sec. butyl, n-butyl, sec. amyl, n-amyl, n-hexyl, sec. hexyl, decyl, dodecyl, benzyl, o-chlorbenzyl, m-chlorbenzyl, dichlorbenzyl, trichlorbenzyl, chlorethyl, chlorpropyl, allyl, isopropenyl and cyclohexyl.

Many of the compounds are not water soluble but may be easily applied in aqueous emulsion or in solution in a suitable organic solvent. Isopropyl alcohol is a satisfactory solvent. Similarly the compounds may be applied in ethyl alcohol solution or in mixtures of water and alcohol in which the particular compound is soluble. If desired, they may be applied simultaneously with the wax customarily used for coating the fruit. One common method of applying a wax or resin is by spraying. This seals the rind and retains the flavor as well as improves the appearance of the fruit. The thionocarbamates may be incorporated in these compositions and sprayed along with the wax. Application in aqueous emulsion is also feasible. The esters are generally soluble in waxes and may be suspended in aqueous wax emulsions applied to the fruit by the familiar dipping operation. Application has also been carried out successfully in polystyrene emulsion and in polyvinyl acetate emulsion.

Further details of the practice and effect of the invention are set forth with respect to the following examples which however are not to be construed as limiting the invention.

*Example I*

Oranges were treated with various thionocarbamates to ascertain the effect of the esters on the growth of fungus. The various lots of oranges were treated with 5%, 2.5% and 1.25% alcohol solutions of the different compounds and then stored for three weeks at 70° F. Butyl thionocarbamate was dissolved in a mixture of 175 parts ethanol and 25 parts acetone by volume. Each series of tests were accompanied by a control experiment in which the oranges were dipped in alcohol containing no thionocarbamate. The observed data is set forth in the following table and designates the total number of oranges decayed after the three weeks period as the result of stem end rot, penicillium rot and miscellaneous decays.

|  | No. of Oranges | Percent of Oranges Decayed | | | |
|---|---|---|---|---|---|
|  |  | Control | 5% | 2.5% | 1.25% |
| Isopropyl thionocarbamate | 75 | 70.5 | 20.0 | 14.7 | 20.0 |
| Butyl thionocarbamate | 25 | 88.0 | 35.8 | 60.0 | 35.8 |
| Amyl thionocarbamate | 75 | 57.2 | 2.7 | 2.7 | 5.4 |
| p-Chlorobenzyl thionocarbamate | 27 | 52.0 | 7.4 | 11.1 | 18.5 |
| Allyl thionocarbamate | 75 | 49.3 | 9.4 | 18.7 | 25.3 |

No injury at all was observed for any of the treatments with isopropyl thionocarbamate and p-chlorobenzyl thionocarbamate and only slight injury with 1.25% solutions of butyl and amyl thionocarbamates. There was slight injury from the 5% solution of allyl thionocarbamate but none from the more dilute solutions.

*Example II*

Using the procedure described in the foregoing tests ethyl thionocarbamate was evaluated in a large scale laboratory test employing a 5% ethanol solution. After three weeks at 70° F. only 1.1% of the fruit showed evidence of decay as compared to 47% decayed of the ethanol control. Ethyl thionocarbamate and isopropyl thionocarbamate were then employed for treating oranges in a packing plant. The fruit were placed on conveyors in conventional manner and removed to the treating bath after they had been washed and scrubbed. They were returned to the conveyor where they were coated and polished and again segregated and examined at weekly intervals for disease counts. A 20% solution of ethyl thionocarbamate in ethanol was prepared and diluted to 10 gallons with water to give a 5% solution. The treating bath containing isopropyl thionocarbamate was prepared by diluting a 10% ethanol solution to 10 gallons with water. Lots of approximately 500 oranges were used per compound, these lots being made up of approximately 100 fruits each of different varieties or from different sources. The results were compared to a comparable number of fruit of an untreated check. Excellent control of fungi was obtained by treating with the thionocarbamate, the ethyl compound being somewhat superior to the isopropyl. There was no significant injury to the fruit. The percent decay after one and two weeks as compared to the untreated check is set forth below:

|  | No. of Oranges | Oranges Decayed, Percent after— | |
|---|---|---|---|
|  |  | 1 week @ 70° F. | 2 weeks @ 70° F. |
| Untreated | 698 | 19.3 | 66.0 |
| Ethyl thionocarbamate | 705 | 0.3 | 3.0 |
| Isopropyl thionocarbamate | 692 | 1.7 | 15.2 |

The thionocarbamates employed for treating fruit can be made by methods described in the literature. For example ethyl thionocarbamate is prepared by condensing potassium ethyl xanthate with sodium chloracetate and reacting the intermediate with ammonia. It is a low melting solid (38–41° C.) very soluble in ether, acetone, alcohol, ethyl acetate, chloroform, benzene and hot water and slightly soluble in heptane. The isopropyl compound is a solid melting at 81° C. and has similar solubility characteristics. Butyl thionocarbamate was first isolated as a yellow oil which set up on cooling. The literature ascribes a melting point of 19° C. It is very soluble in ether, acetone, alcohol, ethyl acetate, chloroform, hot heptane and benzene and slightly soluble in hot water. Amyl thionocarbamate was obtained as a yellow oil by condensing potassium amyl xanthate with sodium chloracetate and reacting the intermediate with ammonia. The reactions were strongly exothermic. The product was isolated as an amber liquid very soluble in ether, acetone, alcohol, ethyl acetate, chloroform, heptane and benzene but only very slightly soluble in hot water. For the preparation of compounds containing unsaturated constituents the reactions should be effected in the cold. For example the intermediate obtained by condensing potassium allyl xanthate with sodium chloracetate is unstable at room temperature but by conducting the reaction at 5° C. and treating with ammonia at 10–15° C., the desired compound was isolated in good yield as an amber oil. It was very soluble in acetone, alcohol, ethyl acetate, chloroform and benzene and soluble in hot water and hot heptane but insoluble in ether. Sulfur calculated 27.3%; found 27.00%. Nitrogen calculated 11.96%, found 11.16%. p-Chlorobenzyl thionocarbamate was obtained in good yield as colorless crystals, melting point 59–60° C. It was soluble in ethyl alcohol from which it may be recrystallized but it was insoluble in water.

What is claimed is:
1. The method of retarding fungus growth on citrus fruit which comprises contacting the fruit with a thionocarbamate.
2. The method of retarding fungus growth on citrus fruit which comprises contacting the fruit with a thionocarbamate of the formula

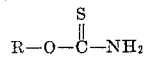

where R is selected from alkyl, alkylene, alicyclic and aralkyl groups.
3. The method of retarding fungus growth on citrus fruit which comprises contacting the fruit with a thionocarbamate of the formula

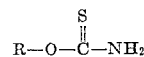

where R is an open chain hydrocarbon group.
4. The method of retarding fungus growth on citrus fruit which comprises contacting the fruit with a benzyl thionocarbamate.
5. The method of retarding fungus growth on citrus fruit which comprises contacting the fruit with an alkyl thionocarbamate wherein the alkyl group contains less than six carbon atoms.
6. The method of retarding fungus growth on citrus fruit which comprises contacting the fruit with ethyl thionocarbamate.
7. The method of retarding fungus growth on citrus fruit which comprises contacting the fruit with isopropyl thionocarbamate.
8. The method of retarding fungus growth on citrus fruit which comprises contacting the fruit with p-chlorobenzyl thionocarbamate.
9. The method of retarding fungus growth on citrus fruit which comprises contacting the fruit with allyl thionocarbamate.
10. The method of retarding fungus growth on citrus fruit which comprises contacting the fruit with a composition containing a wax and a thionocarbamate.
11. The method of retarding the fungus growth on citrus fruit which comprises contacting the fruit with a wax composition containing 0.5 to 10% by weight of a thionocarbamate.
12. The method of retarding the fungus growth on citrus fruit which comprises contacting the fruit with an alcohol solution containing 0.5 to 10% by weight of a thionocarbamate.

References Cited in the file of this patent
UNITED STATES PATENTS

| 2,093,865 | Denny | Sept. 21, 1937 |
| 2,215,446 | Wilson | Sept. 17, 1940 |
| 2,225,124 | Martin | Dec. 17, 1940 |
| 2,537,691 | Mowry | Jan. 9, 1951 |
| 2,570,664 | Gundel et al. | Oct. 9, 1951 |